3,560,412
THERMOSETTING COMPOSITIONS COMPRISING BLENDS OF ACETAL RESINS AND AMINE-ALDEHYDE RESINS
Joseph J. Bernardo, 92 Corabelle Ave., Lodi, N.J. 07644, and Joseph F. Ackerman, 19 Woodmere Road, Cedar Grove, N.J. 07009
No Drawing. Continuation of application Ser. No. 594,405, Nov. 15, 1966. This application Jan. 12, 1970, Ser. No. 7,298
Int. Cl. C08g 37/32, 51/72
U.S. Cl. 260—21
11 Claims

ABSTRACT OF THE DISCLOSURE

Polyacetal resins are made by reacting polyols containing three or more hydroxyl groups with formaldehyde in the presence of acid catalysts. These resins, when blended with amine-formaldehyde resins, are excellent coatings for wood, paper, metal, plastics and glass. The blends are liquid and can be used without addition of solvent.

CROSS-REFERENCE TO RELATED APPLICATION

This application is a continuation of U.S. application Ser. No. 594,405, filed Nov. 15, 1966, now abandoned by the same inventors.

This invention relates to novel compositions. More particularly, it relates to compositions comprising blends of low molecular weight polyacetal resins and amine-aldehyde resins. These coating compositions are particularly useful as coatings.

The composition remain liquid at ambient temperatures even in the absence of solvents and may be used as solvent-free coating compositions.

Because the need for solvents is in many cases eliminated or substantially reduced, the health and pollution hazards associated with solvents in general are also eliminated or reduced. In addition, the equipment, time and safeguards necessary in the handling of solvents may be eliminated.

The compositions of this invention have been found to provide particularly excellent coatings for wood products including plywood, fiberboard and chipboard. The coated wood products are described and claimed in a copending application entitled "Novel Coated Wood Structures," filed on or about the same date as the present application in the names of C. Winchester, J. Faccone and S. Webb.

In addition to wood, the compositions of this invention may be advantageously used as coatings on plastics, glass and metals.

Our compositions comprise blends of (1) polyacetal resins prepared by reacting an aldehyde with a polyhydric alcohol having at least three hydroxyl groups and (2) amine aldehyde resins and melamine formaldehyde resins.

The polyacetal resins comprise the condensation products of polyhydric alcohols containing at least three hydroxyl groups with the aldehydes in the presence of an acid catalyst. The polyhydric alcohols include glycerine, trimethylolethane, trimethylolpropane, pentaerythritol, dipentaerythritol, sorbitol, erythritol and 1,2,6-hexanetriol.

While formaldehyde is the preferred aldehyde and seems to give the best results, other aldehydes may be used instead of the formaldehyde including acetaldehyde, propionaldehyde and butyraldehyde.

In preparing the polyacetal component of the coating, the polyhydric alcohol and the aldehyde are heated at reflux in the presence of the acidic catalyst. No solvent is required for the condensation reaction since the product is liquid at 100% solids. The formation of the condensates of our invention takes place when the components are heated together at temperatures from 100° C. to 225° C. The byproduct of the condensation, water, is distilled out of the mixture and the reaction is terminated when the theoretical amount of water has been collected. During the condensation from about 0.5 to 5.0 moles of aldehyde are preferably employed for each mole of polyhydric alcohol. The acid catalyst preferably constitutes from 0.1 to 3.0% of the total weight of alcohol and aldehyde.

The viscosity of the polyacetal resins and consequently of the blends containing the polyacetal resins has been found to vary with the acid catalysts used. Acid catalysts having pK values of at least 2.12 such as phosphoric acid, phthalic anhydride, citric acid and pelargonic acid may be used to produce polyacetal resins of higher viscosity in the order of from Z to $Z_5$ on the Gardner-Holdt Scale. On the other hand, acids having pK values below 2.12 such as p-toluene sulfonic acid and benzene sulfonic acids may be used to produce polyacetal resins of lower viscosity in the order of G-H on the Gardner-Holdt Scale or lower.

Without commitment on the theory involved, it is believed that the explanation for the effect of the catalysts is that the reactions between the polyhydric alcohols and the formaldehyde if permitted to proceed to completion tends to form a lower viscosity cyclic structure after proceeding through an intermediate stage. When the stronger acids having pK values below 2.12 are used, the reaction proceeds to completion at such a rapid rate that the reaction can not be terminated before the final stage in which the lower viscosity cyclic structure is formed. On the other hand, where the relatively weaker acids having pK values of 2.12 or above are used, the reaction proceeds to completion with difficulty and the polymer is normally in an intermediate stage of higher viscosity.

It should, however, be clear that both the acetal resins produced by catalysis with stronger acids and those produced by catalysis with weaker acids may be readily blended with the amine-aldehyde resins with the viscosity of the blends being directly related to the viscosity of the polyacetal resins.

The amine-aldehyde resin which is blended with the polyacetal resin may be any of the standard commercial urea-formaldehyde or melamine-formaldehyde resins including triazine-formaldehyde resins such as guanamine-formaldehydes, substituted melamine-formaldehyde resins such as hexamethyl ether of hexamethylol melamine, etc. Etherified urea-formaldehyde and melamine-formaldehyde are also operative in this invention. The amine-aldehyde resins can be made by reaction of an aldehyde (preferably formaldehyde) with a polyfunctional amide, such as urea, biuret, dicyanamides and triazines such as ammeline, melamine, substituted melamines and benzogunamine.

When the melamine-formaldehyde used in the blend is the hexamethyl ether of hexamethylol melamine, there is a tendency for the resulting viscosity to be lowered below limits which are necessary for many applications. We have found that a desired viscosity can be achieved in such a case by heating the blend of the hexamethyl ether of hexamethylol melamine and the acetal resin until the selected viscosity level is reached. For example, using a polyacetal resin which is prepared with a weak acid catalyst blended with a triazine-formaldehyde, the resulting viscosity is higher than X on the Gardner-Holdt Scale. When the polyacetal resin is blended with hexamethyl ether of hexamethylol melamine, the viscosity is lowered to about N. This latter blend may be then heated to again increase the viscosity to X or above.

In preparing novel compositions of this invention, preferably 50–90% by weight of polyacetal resin is preferably blended with 10–50% by weight of amine-aldehyde resin.

It has been further found that when the blends of this invention are to be used for coatings on porous substrates such as paper or wood, it is advantageous to incorporate higher fatty acids, preferably $C_{12}$ to $C_{18}$ monocarboxylic acids into the acetal resin. This is accomplished by including such fatty acids in the original reaction mixture being condensed to form the acetal resin. Preferably from 0.1 to 2.0 moles of fatty acid are used for each mole of polyhydric alcohol. Some typical higher fatty acids which may be used in the practice of this invention are myristic acid, palmitic acid, stearic acid, oleic acid, ricinoleic acid, linoleic acid, linolenic acid, eleostearic acid, myristoleic acid and palmitoleic acids. The $C_{12}$ to $C_{18}$ fatty acids may be a mixture, e.g., oil fatty acids such as linseed oil fatty acids or dehydrated castor oil, menhaden oil and perilla oil fatty acids, soya bean oil fatty acids as well as coconut oil, castor oil and cottonseed oil fatty acids.

The following examples will further illustrate the practice of this invention:

Example A

A polyacetal resin of trimethylolpropane and formaldehyde is prepared as follows:

Melt 1495 g. of trimethylolpropane by heating to 95° C. and then add 278.5 g. of paraformaldehyde and 1.77 g. of p-toluene-sulfonic acid to the polyol. The reaction is heated to reflux, 129° C., and the water of condensation starts to distill over. After one hour the temperature reaches 193° C. and the distillate stops coming over; the total distillate collected is 165 g. The condensation product has a viscosity of G on the Gardner-Holdt Scale.

Example B

Example A is repeated using the same ingredients, procedure and conditions except that in place of the p-toluene-sulfonic acid, there is used 27 g. of pelargonic acid. The reaction temperature eventually reaches 210° C. and the total distillate collected is 105 g. The product is a water white liquid with a viscosity of Z–5 (Gardner-Holdt Scale).

Example C

The preparation of a polyacetal resin of trimethylolpropane and formaldehyde in the presence of phthalic anhydride:

Melt 2490 g. of trimethylolpropane by heating to 93° C. and add 465 g. of paraformaldehyde and 45 g. of paraformaldehyde and 45 g. of phthalic anhydride. The mixture is heated at reflux for 3 hours until 297 g. of distillate are collected, the reaction temperature reaches 210° C. The product is a clear liquid with a viscosity of Z–4 on the Gardner-Holdt Scale.

Example D

A polyacetal resin of pentaerythritol and formaldehyde is prepared as follows:

A reaction mixture consisting of 950 g. of pentaerythritol and 1050 g. of 37% formalin are heated to 95° C. and then 5 g. of p-toluene sulfonic acid are added. The reaction is heated at reflux, the temperature reaches 140° C., until 888 g. of water have been collected by distillation. The condensation product is a clear viscous liquid with a viscosity of H on the Gardner-Holdt Scale.

Example F

A reaction mixture of 59.1 parts of trimethylol propane and 29.7 parts of soya fatty acids is heated at 200° C. until the acid number is reduced below 10 and then 10.2 parts paraformaldehyde and 1.0 part of phthalic anhydride are added. The reaction mixture is heated at reflux, about 100 to 200° C. until about 6 to 7 parts of water have been collected by distillation. The condensation product is a clear viscous liquid with a viscosity of $Z_2$ on the Gardner-Holdt Scale.

Example G

A reaction mixture of 67.3 parts of a mixture of $C_{16}$ to $C_{18}$ fatty acids having an acid number of 195 and an iodine value of 30–38 and 30.6 parts of pentaerythritol are heated at 200° C. until the acid number is reduced below 10 and then 5.2 parts of paraformaldehyde and 0.5 part of phthalic anhydride are added. The reaction mixture is then heated at reflux, about 100 to 200° C. until about 3.0 to 3.5 parts of water have been collected by distillation. The condensation product is a clean viscous liquid with a viscosity of $Z_4$–$Z_5$ on the Gardner-Holdt Scale. The polyacetal product is a hazy liquid with a viscosity of Z–5 on the Gardner-Holdt Scale.

Example 1

A coating composition is prepared by blending the following components:

| | Parts by weight |
|---|---|
| Polyacetal resin of Example A | 40.0 |
| Hexamethyl ether of hexamethylol melamine | 10.0 |
| p-Toluene sulfonic acid | 0.1 |
| Xylene | 10.0 |

The blend is drawn down on a steel panel and baked at 100° C. for 10 minutes. The resulting film is hard, mar resistant, and exhibits excellent resistance to solvents, detergents and discoloration.

Example 2

A coating composition is prepared by blending the following components:

| | Parts by weight |
|---|---|
| Polyacetal resin of Example C | 40.0 |
| A solution of butylated urea-formaldehyde resin in 3:2 butanol:xylene solvent having a 50% resin content | 20.0 |
| p-Toluene sulfonic acid | 0.05 |

The blend is drawn down on a steel panel and baked at 100° C. for 10 minutes. The film is hard, mar resistant, and exhibits excellent resistance to solvents, detergents and discoloration.

Example 3

Example 2 is repeated using the same ingredients, proportions, conditions and procedure except that in place of the urea-formaldehyde of Example 2, there is used a 50% solution in 1:1 butanol:xylene of a butylated melamine-formaldehyde resin. The resulting film has properties similar to the film in Example 2.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:

1. A resinous composition comprising a blend of (1) 50 to 90% of a polyacetal resin prepared by reacting 0.5 to 5.0 moles of mormaldehyde and 0.1 and 2.0 moles of $C_{12}$–$C_{18}$ monocarboxylic acids with one mole of a polyhydric alcohol selected from the group consisting of glycerin, trimethylolethane, trimethylolpropane, pentaerythritol, dipentaerythritol, sorbitol, erythritol and 1,2,6-hexanetriol, in the presence of an acid catalyst by heating at reflux and (2) 10 to 50% by weight of an amine-aldehyde resin selected from the group consisting of urea-formaldehyde resins and melamine-formaldehyde resins.

2. A resinous composition comprising a blend of (1) 50 to 90% of a polyacetal resin prepared by reacting 0.5 to 5.0 moles of formaldehyde and 0.1 to 2.0 moles of $C_{12}$–$C_{18}$ monocarboxylic acids with one mole of polyhydric alcohol selected from the group consisting of glycerine, trimethylolethane, trimethylolpropane, pentaerythritol, dipentaerythritol, sorbitol, erythritol and 1,2,6-hexanetriol, in the presence of an acid catalyst having a pK value of at least 2.12 by heating at reflux and (2) 10 to 50% by weight of an aminealdehyde resin selected from the group consisting of urea-formaldehyde resins and melamine-formaldehyde resins.

3. The composition of claim 2 wherein the catalyst is selected from the group consisting of phosphoric acid, phthalic anhydride, citric acid and pelargonic acid.

4. The composition of claim 2 wherein the monocarboxylic acids are selected from the group consisting of myristic acid, palmitic acid, stearic acid, oleic acid, ricinoleic acid, linoleic acid, linolenic acid, eleostearic acid, myristoleic acid, palmitoleic acid, linseed oil fatty acids; dehydrated castor oil, menhaden oil and perilla oil fatty acids; soya bean oil fatty acids; coconut oil, castor oil and cottonseed oil fatty acids.

5. The composition of claim 1 wherein said amine-aldehyde resin is ureau-formaldehyde.

6. The composition of claim 1 where said aminealdehyde resin is melamine-formaldehyde.

7. The composition of claim 1 wherein said alcohol is trimethylol propane.

8. The composition of claim 1 wherein said alcohol is pentaerythritol.

9. The composition of claim 1 wherein said acid catalyst is p-toluene sulfonic acid.

10. The composition of claim 3 wherein said acid catalyst is phthalic anhydride.

11. A solvent-free resinous composition comprising the blend of claim 1.

References Cited

UNITED STATES PATENTS

| | | | |
|---|---|---|---|
| 2,071,252 | 2/1937 | Carothers | 260—67FP |
| 2,512,671 | 6/1950 | Novotny et al. | 260—849 |
| 2,785,949 | 3/1957 | Kress | 260—67 |
| 2,785,996 | 3/1957 | Kress | 260—67 |

FOREIGN PATENTS

| | | | |
|---|---|---|---|
| 976,712 | 12/1964 | Great Britain | 260—849 |

JOHN C. BLEUTGE, Primary Examiner

U.S. Cl. X.R.

117—124, 132, 138.8, 148, 155, 161; 260—32.8, 33.4, 33.6, 67, 849